United States Patent [19]

Bonazelli

[11] Patent Number: 5,972,400

[45] Date of Patent: Oct. 26, 1999

[54] VEGETABLE OIL FOR THE PREPARATION OF PASTRY

[75] Inventor: Paolo Bonazelli, Via Monte Partemio 3, Cartoceto PS, Italy

[73] Assignees: Marco Bonazelli; Paolo Bonazelli, both of Cartoceto, Italy

[21] Appl. No.: 08/930,513

[22] PCT Filed: Apr. 4, 1996

[86] PCT No.: PCT/IB96/00283

§ 371 Date: Oct. 3, 1997

§ 102(e) Date: Oct. 3, 1997

[87] PCT Pub. No.: WO96/31582

PCT Pub. Date: Oct. 10, 1997

[30] Foreign Application Priority Data

Apr. 6, 1995 [IT] Italy ................................ PS95A0006

[51] Int. Cl.[6] ........................................................ A23D 9/04
[52] U.S. Cl. ........................ 426/312; 426/417; 426/474; 426/524; 426/606; 554/175
[58] Field of Search .................... 426/417, 312, 426/474, 606, 524; 554/8, 9, 175

[56] References Cited

U.S. PATENT DOCUMENTS

| | | | |
|---|---|---|---|
| 3,637,402 | 1/1972 | Reed | 426/474 |
| 3,713,841 | 1/1973 | MacManus | 426/474 |
| 4,156,688 | 5/1979 | Zosel | 426/417 |
| 4,370,274 | 1/1983 | Finch | 554/8 |
| 4,452,744 | 6/1984 | Finch | 554/8 |
| 4,952,224 | 8/1990 | Lilakos . | |
| 5,066,504 | 11/1991 | Asbeck | 426/417 |
| 5,073,398 | 12/1991 | Kuss | 426/417 |
| 5,091,116 | 2/1992 | Krishnamurthy | 426/417 |
| 5,298,271 | 3/1994 | Takashina | 426/312 |
| 5,374,751 | 12/1994 | Cheng | 426/417 |
| 5,482,633 | 1/1996 | Muraldihara | 554/8 |
| 5,637,338 | 6/1997 | Van Aalst | 426/312 |

FOREIGN PATENT DOCUMENTS

| | | |
|---|---|---|
| 0 285 198 | 10/1988 | European Pat. Off. . |
| 2 380 225 | 8/1990 | European Pat. Off. . |
| 0 422 714 | 4/1991 | European Pat. Off. . |
| 500152A1 | 8/1992 | European Pat. Off. . |
| 1 922 039 | 11/1970 | Germany . |
| 2 253 515 | 5/1974 | Germany . |
| 207551 | 5/1925 | United Kingdom . |
| WO94/12596 | 6/1994 | WIPO . |
| WO94/15479 | 7/1994 | WIPO . |

OTHER PUBLICATIONS

Shaw 1904 California Olive Oil, Its Manufacture pp. 32–33 University of California Publications Bulletin No. 158 Agricultural Experiment Station.

Cruess 1924 The Preparation and Refining of Olive Oil in Southern Europe pp. 30–33 University of California Circular No. 279 Agricultural Experiment Station.

Hui 1996 Baileys Industrial Oil and Fat Products 5th edition pp. 52–56 Wiley InterScience Publication New York.

(Derwent Publications Ltd.) JP A 63–133942 / Jun. 6, 1988—Kanegafuchi Chem KK (English Abstract).

(Derwent Publications Ltd.) JP A 63–141547 / Jun. 14, 1988—Asahi Denka Kogyo (English Abstract).

*Primary Examiner*—Carolyn Paden
*Attorney, Agent, or Firm*—Nims, Howes, Collison, Hansen & Lackert

[57] ABSTRACT

The present invention concerns a vegetable alimentary oil, preferably virgin or extra-virgin olive-oil, carried to a particular solid state, so as to increase notably the volume for making it suitable to the product of short pastry, friable biscuits and the like, in substitution of animal fats, butter and margarines. To achieve such features, the oil is solidified by carrying it to low temperature in a whisking device, with simultaneous air or inactive gas inlet. The oil it could be aromatised with natural substances, that they don't degenerate thanks of the low temperature of maintenance of the product.

17 Claims, No Drawings

VEGETABLE OIL FOR THE PREPARATION OF PASTRY

TECHNICAL FIELD

The present invention concerns a vegetable alimentary oil, preferably virgin or extra-virgin olive-oil, carried to a particular solid state, so as to increase notably the volume for making it suitable to the preparation of short pastry, friable biscuits or other alimentary products.

BACKGROUND ART

The short pastry and the friable pastas for sweets are achieved by using solid state fats, as butter, margarines or lard. In these products the friability does not come from the action of yeasts, but from the solid fats mixed very quickly with the other ingredients (flour, eggs and sugar), so as to avoid the melting. The so obtained mixture incorporates uniformly fat particles that are still in the solid state and that, during the subsequent cooking, change to the liquid state, with the consequent volumetric reduction. This volume reduction creates so much small empty spaces, that determine the characteristic alveolar typical section of the short pastry.

Document EP-A-0 422 714 concerns an edible fat composition (mainly margarine) wherein the fat phase comprise a homogeneous dispersion of fine crystals and in which the fat phase is essentially free of crystalline aggregates so as spoilage is greatly reduced.

Anhydrous products can be produced by melting the fat, at 58–61° C., cooling to 16° C. the melted fat to a temperature at which partial crystallisation occurs, homogenising the partially crystallised fat, by heating it to 26.5–29.5° C., and cooling to 16–19° C. the homogenised fat to further crystallise the fat at a temperature of 17.5° C.

Moreover this document envisages the use of "high stearic" vegetable oils, but, even in this case, the edible fat composition is obtained with a process always working at a temperature above 16° C. which includes, first of all, heating the product, cooling the melted product, homogenising (heating again) this latter and finally cooling.

The document EP-A-0 285 198 discloses an edible plastic product (mainly margarine) comprising a continuous fat phase and a dispersed gas phase and to a process for the preparation thereof. This product is mainly used for frying.

The preferred products consist essentially of a continuous fat phase, a dispersed aqueous phase and a dispersed gas phase, for example gas-containing margarine.

This document also discloses a process for the preparation of this edible plastified product incorporating gas, that includes helium in the composition that is to constitute the product and subjecting the gas-containing composition to plastifying conditions at super-atmospheric pressure.

Even if the 20–100% of the gas contained in the product is helium and the balance of the gas can suitably be air or, preferably, nitrogen, the process for preparing this product always includes that the composition is plastified trough a scraper-surface heat exchanger, a stirred crystalliser, another scraper-surface heat exchanger and a resting tube. The obtained product is stored at 5° C.

In other words, this process always includes heating the composition before stirring this latter. In any case all the process is conducts at a temperature above 0° C.

The document JP-A-63 133 942 discloses a preparation of a fat and oil compound containing air bubbles by heating this latter to be molten, than chilling and kneading the molten compound by controlling the decreasing rate of temperature within the melting range for the product.

Also this fat and oil compound is obtained by firstly heating the same, and than by chilling this latter at a temperature above the melting range of the product.

The abovementioned edible fat compounds mainly include margarines or emulsion made from such fat and oil and the processes for making thereof firstly include the heating of the compound, normally to relatively high temperatures (50–60° C.) so reducing this latter to its liquid phase.

The abovementioned edible compounds often include preservatives and emulsions so avoiding the spoilage by molds, bacteria and physical changes occuring on storage, but surely introducing into said compounds unhalthy and cancerogenic elements.

The oil usage would be advantageous because there is no ingestion of an high quantity of cholesterol or saturated fats that are injurious to the health, and that are included in the animal fats, in the butter and in the margarines, but neither the liquid oil, nor the normally solidified oil, would have that volume reduction necessary to make the wished porosity.

DISCLOSURE OF THE INVENTION

The object of the present invention is to allow the preparation of short pastry and friable pastas for sweets, or for alimentary products in general, with vegetable alimentary oil, preferably virgin or extra-virgin olive-oil, in substitution of the currently used fats.

Such object is achieved by a method for making an ingredient based on vegetable alimentary oil, preferably virgin or extra-virgin olive-oil, essentially according to the first claim.

BEST MODE OF CARRYING OUT THE INVENTION

The method for making an ingredient based on vegetable alimentary oil, preferably virgin or extra-virgin olive-oil, for the preparation of short pastry, such as friable biscuits or the like, comprises: the agitation of an amount of oil with the consequent imprisonment of a volume of a gas in the oil amount; the continuous mixing and progressive refrigeration of the mixture made up of this oil and gas with the consequent volumetric expansion of the mixture so obtained, and the solidification of this latter for carrying out the ingredient used in the production of the short pastry.

The gas used is air or an inactive gas, such as the nitrogen for avoiding the ingredient oxidation.

The mixing of the oil with the gas could be carried out in a forced manner, for instance through suitable pumps, while the final volumetric expansion of the ingredient could range from 20 percent to 40 percent of the initial volume of the oil amount, with an optimal percentage of 36 percent.

The refrigeration reaches a temperature ranging from −25° C. to −30° C., while the temperature of the ingredient in the solid state ranges from −10° C. to −15° C.

The method could further include the cooling of the oil amount before the agitation of this latter.

Therefore the ingredient includes a prearranged oil amount and a plurality of little gas bubbles imprisoned therein by virtue of the fact that the ingredient is kept to its solid state by means of low temperatures.

In this way a uniform mass of solidified oil is achieved, with notably increased volume, that causes, during the mixture cooking, the same effects of the fats used up to now: the short pastry presents an inside alveolar structure including empty spaces at the end of the cooking process.

The solidification does not happen for a chemical effect of hydrogenation and glut of the molecules, as it happens for the margarines, so as to the alimentary hygiene this preparation marks another achievement in the struggle against the cholesterolemias and the cardiovascular illness, due to the ingestion of high quantity of cholesterol and saturated fats.

In fact, the main advantage of the olive-oil consists in that it presents a percentage of fat acids (particularly linoleic acid 8–10 percent) very similar to that presented by the lipidic component of the maternal milk and by the composition of the human adipose tissue (linoleic acid 11 percent). Therefore, such oil is rather digestible, activates the hepatic functionality and lowers the cholesterolemia, in comparison with that does not happen with the other ingredients based on alimentary fats.

It has also been verified that the new ingredient has a power of particularly high seasoning, that allows the reduction of the fat amount inside the alimentary products, till the percentage of also beyond the 30 percent.

Another useful usage of the described solid-creamy state oil is the aromatised seasonings. These latter are aromatised with synthetic compounds without any aromatic raw materials, that would be subject to fermentation and alterations because of their water content. The natural amortisers (paprika, garlic, truffle, etc.) do not degenerate with the described solid oil, by virtue of the low maintenance temperature of the product.

The ingredient, constituting by the cream of solidified and expanded oil, could be packaged in small basins, jars, pats or in any other desired way.

I claim:

1. A method for making a solid shortening based on olive oil, said method comprising:
   agitating an amount of olive oil in the presence of a volume of gas so as to disperse the gas in said olive oil, producing an olive oil and gas mixture;
   progressively refrigerating the agitating mixture to a temperature ranging from −20° C. to −30° C., volumetrically expanding said mixture by capturing the dispersed gas therein; and,
   solidifying the olive oil and gas mixture at a temperature below 0° C., to produce the solid shortening.

2. The method of according to claim 1, wherein said gas is forced into the olive oil during agitation.

3. The method according to claim 1, wherein the volumetric expansion of the ingredient ranges from 20 to 40 percent over an initial volume of said olive oil.

4. The method according to claim 1, wherein the volumetric expansion of said ingredient is 36 percent over an initial volume of said olive oil.

5. The method according to claim 1, wherein said ingredient is solidify at a temperature ranging from −10 to −15° C.

6. The method according to claim 1, further comprising adding an aromatizing agent to said olive oil and gas mixture, said aromatizing agent being self-preserved in the solid ingredient at the solidification temperature.

7. The method according to claim 1, further comprising packaging the solid ingredient.

8. The method according to claim 7, wherein the ingredient is packaged in packages selected from the group consisting of small basins, jars, and pats.

9. The method according to claim 1, further comprising, before agitating the olive oil, cooling the olive oil.

10. The method according to claim 1, wherein the olive oil is selected from the group consisting of virgin and extra virgin olive oil.

11. The method according to claim 1 wherein the gas is selected from the group consisting of air and nitrogen.

12. A solid shortening based on olive oil consisting essentially of solidified olive oil having a plurality of gas bubbles imprisoned therein, said ingredient having a volume greater than the volume of said olive oil not having the gas bubbles therein.

13. The solid ingredient of claim 12, wherein the olive oil is selected from the group consisting of virgin and extra virgin olive oil.

14. The ingredient according to claim 12, wherein the ingredient has a volume 20 to 40 percent greater than an initial volume of said olive oil.

15. The ingredient according to claim 12, wherein the ingredient has a volume 36 percent greater than an initial volume of said olive oil.

16. The ingredient according to claim 12, further comprising an aromatizer dispersed therein which is preserved in the solidified ingredient.

17. The ingredient according to claim 12, wherein the gas is selected from the group consisting of air and nitrogen.

* * * * *